United States Patent Office 3,424,727
Patented Jan. 28, 1969

3,424,727
CATALYST SYSTEM FOR PREPARATION OF ALKYLENE TEREPHTHALATE POLYMERS
John F. Walker, Wilmington, Del., assignor to Hercules Incorporated, Wilmington, Del., a corporation of Delaware
No Drawing. Filed Aug. 8, 1966, Ser. No. 570,706
U.S. Cl. 260—75                    5 Claims
Int. Cl. C08g 17/013

ABSTRACT OF THE DISCLOSURE

Improved results are attained in the production of polyesters from alkylene glycol and dialkyl terephthalate by heating the alkylene glycol and dialkyl terephthalate in the presence of a divalent metal oxide catalyst to effect the ester interchange and then heating the product in the presence of said divalent metal oxide catalyst and a divalent metal antimonite as an additional catalyst to effect polymerization.

---

This invention relates to an improved method for preparing synthetic linear polyesters and, more particularly, alkylene terephthalate polymers.

The production of film- and fiber-forming linear polyesters of terephthalic acid and alkylene glycol of the series $$HO(CH_2)_nOH$$

where $n$ is an integer from 2 to 10, has been described many times in the art. From a commercial standpoint, probably the most attractive polymer of the above class is poly(ethylene terephthalate) and the most widely used process for its production comprises carrying out an ester interchange between ethylene glycol and dimethyl terephthalate and then polymerizing the resultant glycol terephthalate by splitting off ethylene glycol under reduced pressure at an elevated temperature.

It is known to use a catalyst for the ester interchange and a different catalyst for polymerization and it is also known to use a single catalyst for both reactions. In particular, antimonites of the divalent metals are known to be well suited for this purpose. These catalysts are known to be prepared by fusing at 450–700° C. the appropriate metal oxide (MO) with antimony oxide in stoichiometric proportion as shown by the reaction:

$$MO + Sb_2O_3 \rightarrow M(SbO_2)_2$$

These catalysts are excellent catalysts for the polymerization step, but they are inadequate for the ester interchange step so that the ester interchange step is the rate determining step for the two reactions when thus run stepwise. These different rates cannot be equalized by changing the amount of catalyst as they could be if the second reaction were slower without introducing a disproportionately large amount of catalyst which affects the properties of the polyester.

It has now been found that these two steps may be run stepwise at substantially equal rates by using a divalent metal oxide as the catalyst for the ester interchange step and a mixture of divalent metal oxide and divalent metal antimonite as the catalyst for the polymerization step.

The divalent metal oxide is a better catalyst for the ester interchange reaction than is the metal antimonite and it does not act cumulatively with the metal antimonite in the polymerization step.

In accordance with the above discovery, the invention is directed to an improvement in the process of producing poly(alkylene terephthalates) wherein an alkylene glycol of 2 to 10 carbon atoms is reacted under ester interchange conditions with a lower dialkylterephthalate and the resulting glycol terephthalate is polymerized by splitting off of glycol, which improvement comprises carrying out the ester interchange in the presence of a catalytic amount of a divalent metal oxide and polymerization in the presence of a catalytic amount of a divalent metal antimonite and divalent metal oxide.

The metal oxide used in the ester interchange step may be the oxide of the same or different metal from the metal of the divalent metal antimonite, but it is preferably the same.

The metal antimonites used as catalysts in the invention are simple compounds that can be prepared by simply fusing the appropriate metal oxide (MO) with antimony oxide in an inert atmosphere in stoichiometric proportion at a temperature of about 450–700° C., viz., the following reaction:

$$MO + Sb_2O_3 \rightarrow M(SbO_2)_2$$

The following examples are presented as illustrative of the invention. Parts and percentages are by weight unless otherwise specified. Intrinsic viscosity in the examples was determined at 25° C. on a 1% solution of polymer in a 60:40 weight blend of phenol and tetrachloroethane. Percentage of catalyst is based on the quantity of dimethylterephthalate initially present.

EXAMPLES

General procedure for preparation of polymer

All polymers in these examples were prepared by mixing a hot melt of 253 parts of dimethylterephthalate, 80 parts of ethylene glycol, and predetermined amounts of divalent metal oxide catalysts in a reaction vessel equipped with a distillation column and agitator at 135–245° C. under agitation. Ester interchange takes place when the temperature within the reaction vessel is about 135–200° C. Distillation of methanol from the vessel takes place rapidly as the temperature is increased gradually to maintain the rate of methanol evolution. Finally, when the reaction temperature has reached about 230–245° C. and the theoretical quantity of methanol has been evolved and collected, the heating is terminated and the resulting glycol terephthalate is transferred from the reaction vessel to a preheated polymerization vessel. The glycol terephthalate product in all cases consists essentially of bis(hydroxyethyl) terephthalate.

The polymerization vessel is a vacuum reactor provided with a nitrogen sparge and an evacuation outlet. After the glycol terephthalate product is placed in this vessel and heated to 240° C., a catalytic amount of divalent metal antimonite is added and the temperature is increased over a 2 hour period to 285° C. while reducing the pressure over this period of time to about 0.5 mm. Hg until the desired intrinsic viscosity is reached. The polymer is then extruded from the reactor.

The quality of the polymer is determined by measuring its intrinsic viscosity, softening point and color.

The results of several experiments comparing the process of the invention with processes outside the invention using only $Mn(SbO_2)_2$ as catalyst are presented tabularly as follows:

| Example No. | Catalyst | Percent | Reaction time (hours) Ester | Reaction time (hours) Polymer | I.V.[2] |
|---|---|---|---|---|---|
| 1a | MnO | 0.018 | 6.2 | | |
| 1b | Mn(SbO$_2$)$_2$ | 0.024 | | 5.7 | 0.64 |
| 2a | MnO | 0.018 | 6.5 | | |
| 2b | Mn(SbO$_2$)$_2$ | 0.009 | | 5.0 | 0.65 |
| 3a | Mn(SbO$_2$)$_2$ | 0.020 | 8.5 | | |
| 3b | Mn(SbO$_2$)$_2$ | ([1]) | | 5.7 | 0.66 |

[1] No more added.  [2] Intrinsic viscosity.

When the $Mn(SbO_2)_2$ catalyst was used in the same amount in both the ester interchange and the polymerization reactions instead of the metal oxide in the ester interchange reaction, the ester interchange reaction required about 30% to 50% more time for completion than in Examples 1 and 2.

The process of the invention is characterized by reacting a dialkyl terephthalate and an alkylene glycol under ester interchange conditions in the presence of a divalent metal oxide and then polymerizing the resulting glycol terephthalate by splitting off of glycol to form a high molecular weight linear polyester in the presence additionally of a catalytic amount of a divalent metal antimonite. The examples have illustrated the use of oxides and antimonites of manganese but the dominant tendency to form high quality polymers is noticeable with other divalent metal oxides and metal antimonites, for example, those of beryllium, calcium, strontium, barium, zinc, mercury, lead, iron, cobalt, nickel, copper, chromium and all other metals that form divalent antimonites. The common quality of each of these antimonite catalysts is, of course, the ability to give light colored polymers with the amount of catalyst required. Since the catalyst remains in the polymer, the amount of catalyst used is important not only for avoiding color, but even more important for avoiding thermal instability and a change in the excellent electrical properties of the polymer. The advantage of the metal oxide ester exchange catalysts is that they accelerate the ester interchange reaction without a disproportionate increase in the amount of residual catalyst which would decrease the value of the polymer for many uses.

The distinguishing feature of the invention is the employment of divalent metal oxide for the first step and the specified antimonite catalyst together with the divalent metal oxide for the second step. Other details of the process are as already known to the art. Typically, the initial ester interchange can be conveniently carried out by reacting the terephthalate esters and glycol in molar proportions of about 0.25 to 0.7 mole of the former to each mole of the latter at atmospheric pressure at a temperature between 100° and 260° C., preferably between 135° and 235° C. It may also be carried out at pressures above and below atmospheric pressure if desired.

The product from the ester interchange is conventionally a mixture of bis(hydroxyalkyl terephthalate) and low molecular polymers of this compound having an average degree of polymerization of less than 4, such products being commonly defined in the art as "glycol terephthalate."

As is also conventional in the art, polymerization of the ester interchange product is effected in the liquid phase at a reduced pressure in the vicinity of 0.05–20 mm. Hg, more preferably within the range of 0.5–5 mm. Hg, for optimum results, a reduced pressure being required to remove glycol which is split off as a result of condensation. A temperature between 230° and 290° C. is desirable and should be maintained during the polymerization which is carried out until a polymer of desired molecular weight is obtained.

While dimethyl terephthalate and ethylene glycol are the preferred starting materials for the practice of the invention, other dialkyl terephthalates in which the alkyl groups contain not more than 4 carbon atoms, e.g., di- ethyl, di-n-propyl and di-n-butyl terephthalates can be used and likewise alkylene glycols having up to 10 carbon atoms can be employed. These are the essential reactants but it is not intended to exclude other modifying reactants such as dialkyl ortho- and isophthalates and the like since these can be employed to replace a part of the dialkyl tereph halate to effect a slight to moderate alteration of final polymer properties. Also, other glycols, such as butanediol-1,4-octanediol-1,8, etc., that contain up to 10 carbon atoms can be used in place of ethylene glycol.

From the standpoint of accelerating the reactions involved, the amount of catalyst is not an important factor. However, it is desirable to keep the amount of catalyst as low as possible in order to achieve optimum properties. With these considerations in mind, the total amount of catalyst employed in the invention should be less than about 0.5% of the combined weight of starting reactants, preferably from 0.1 to 0.025%. As already explained, the total catalyst is the sum of the divalent metal oxide and the specified antimonite compounds but it may be a mixture of one divalent metal oxide and a different divalent metal antimonite compound. In such case, the presence of at least 0.005% each of divalent metal oxide and divalent metal antimonite based on the weight of reactants is essential to obtain the advantages of the invention in the respective steps.

What I claim and desire to protect by Letters Patent is:

1. In the process for producing high molecular weight polyesters wherein an alkylene glycol is reacted under ester interchange conditions with a lower dialkyl terephthalate and the resulting glycol terephthalate is polymerized by splitting off of glycol, the improvement which comprises carrying out the ester interchange reaction in the presence of a catalytic amount of a divalent metal oxide as the sole catalyst for said ester interchange reaction, and carrying out the polymerization reaction in the presence of said divalent metal oxide and a catalytic amount of a divalent metal antimonite as a catalyst for said polymerization reaction.

2. The process of claim 1 wherein dimethyl terephthalate is reacted with ethylene glycol.

3. The process of claim 1 wherein the divalent antimonite is manganese antimonite and the divalent metal oxide is manganous oxide.

4. The process of claim 2 wherein the divalent antimonite is manganese antimonite and the divalent metal oxide is manganous oxide.

5. The process of claim 4 wherein the total amount of divalent metal catalysts comprises from 0.005% to 0.5% by weight of the reactants.

References Cited

UNITED STATES PATENTS

| 3,057,823 | 10/1962 | McNeil | 260—75 |
| 3,057,828 | 10/1962 | McNeil | 260—75 |

H. D. ANDERSON, *Primary Examiner.*

LOUISE P. QUAST, *Assistant Examiner.*

U.S. Cl. X.R.

260—475; 252—471